United States Patent [19]

Hiromori et al.

[11] Patent Number: 4,791,025

[45] Date of Patent: Dec. 13, 1988

[54] STAINLESS STEEL WIRE AND PROCESS FOR MANUFACTURING THE SAME

[75] Inventors: Masahiro Hiromori; Toshimi Nakahara, both of Itami, Japan

[73] Assignee: Sumitomo Electric Industries, Ltd., Osaka, Japan

[21] Appl. No.: 853,014

[22] Filed: Apr. 17, 1986

[30] Foreign Application Priority Data

Apr. 23, 1985 [JP] Japan .................................. 60-88070
Jul. 17, 1985 [JP] Japan .................................. 60-159189

[51] Int. Cl.[4] ......................... B32B 15/00; D02G 3/00

[52] U.S. Cl. ..................................... 428/379; 428/380; 428/381; 428/389; 428/607; 428/626; 428/679

[58] Field of Search ............... 428/380, 381, 389, 607, 428/626, 679, 379, 383

[56] References Cited

U.S. PATENT DOCUMENTS

| | | | |
|---|---|---|---|
| 1,441,686 | 1/1923 | Jones | 428/381 |
| 1,562,711 | 11/1925 | Madsen | 428/607 |
| 2,828,234 | 3/1958 | Hengel et al. | 428/379 |
| 3,966,425 | 6/1976 | Takeo | 428/626 |
| 3,977,839 | 8/1976 | Palisin, Jr. | 428/626 |
| 3,989,767 | 11/1976 | Homma et al. | 260/834 |
| 4,172,168 | 10/1979 | Stoner, III | 427/178 |
| 4,188,458 | 2/1980 | Hugosson et al. | 428/626 |
| 4,411,964 | 10/1983 | Hara et al. | 428/626 |

OTHER PUBLICATIONS

Nozaki, T., Chemical Abstract, 86:108150p, 1977 of Japanese Pat. No. 76-127126.

Nakamura, H., et al., Chemical Abstract, 86:108151q, 1977 of Japanese Pat. No. 76-125108.

Nakamura, H. et al., Chemical Abstract, 86:108152r, 1977 of Japanese Pat. No. 76-125109.

Nakamura, H. et al., Chemical Abstract, 86:108153s, 1977 of Japanese Pat. No. 76-125110.

Derwent Abstract, 76-17462x/10 of Japanese Pat. No. 51-006845.

*Primary Examiner*—Sharon A. Gibson
*Attorney, Agent, or Firm*—Harness, Dickey & Pierce

[57] ABSTRACT

A stainless steel wire for springs is proposed which has a colored coating of resinous paint thereon. The wire is coated with a paint, dried and baked to form a coating and is then drawn to a desired diameter. The coating has a good adhesiveness and good heat resistance. The stainless steel wire may be nickel-plated before painting.

2 Claims, No Drawings

STAINLESS STEEL WIRE AND PROCESS FOR MANUFACTURING THE SAME

BACKGROUND OF THE INVENTION

The present invention relates to a stainless steel wire particularly for use as the material for springs, and process for manufacturing the same.

As a material for springs, stainless steel wire has better corrosion resistance and better heat resistance than carbon steel wire, but has poorer workability into bearings. The invention of nickel-plated stainless steel wire has obviated the shortcoming and has widened the application of stainless steel wire. On the other hand, springs are made in a wide variety of shapes. In order to prevent springs of similar shapes from mixing, it has become usual to color springs for color identification and decoration.

For the coloring of springs, there are two methods. One is to paint the wire after worked into springs: the other is to paint it before working. With the former method, it is difficult to paint springs uniformly and it is more time-consuming to paint springs one by one. Thus, the latter method has been proposed. In the latter method, before working the wire into springs, a heat-resistant paint is applied thinly on the wire. The paint must be such as to withstand the temperature of annealing done after working into springs to improve the strength of springs. On the other hand, wire for springs is required to have a coating having good adhesiveness and lubricity to stabilize the shape of springs. Also, it is required to have a stable way of curling. A stainless steel wire for springs is generally subjected to drawing after solution heat treatment. The lubricant used in the drawing step remains uniformly on the drawn wire in a thin layer. The remaining lubricant serves as a lubricant in the ext step, that is, working into springs. In this working step, a stable curling is given to the wire. But, if the wire were painted before working into springs, there would be no lubricant remaining on the surface of wire. Therefore, poor lubrication causes wide variation in the shape of springs and peeling of the coating. Also, painting by baking is preferable to achieve a coating having a good adhesiveness. But, high temperature for baking impairs the toughness of wire. Painting the wire which has been elongated by cold-drawing takes a longer time and more labor.

An object of the present invention is to provide a stainless steel wire for springs which is colored, has a good workability into springs, uniform wire diameter, and as good toughness as ordinary stainless steel wire for springs.

Another object of the present invention is to provide a process for manufacturing such a stainless steel wire for springs.

SUMMARY OF THE INVENTION

In accordance with the present invention, a paint film of colored resinous paint with a thickness of 1 to 500 microns is formed by baking on a stainless steel wire or on a stainless steel wire with a nickel plated layer of 0.1 to 15 microns. The paint film is baked so as to have a pencil hardness of less than 6H (JIS K-5400). The painted and baked wire is cold-drawn so that the cold-drawn wire will have a coating of colored resinous paint with a thickness of 0.1 to 50 microns. The coating is such as not to discolor if let to stand for 1 to 60 minutes at a temperature of 200° to 400° C.

The paint resin used for coating should be one having excellent heat resistance such as tetrafluoroethylene resin (PTFE), trifluoroethylene chloride resin (PCTFE), polyester, polyester imide, polyamideimide, polyimide, silicone modified resin, polyhydantoin and polyimidazopyrrolon.

The enamel using such a resin may be used as a main ingredient. An organic or inorganic coloring agent is added to the paint enamel. The coloring agent should not discolor when let to stand at 80° C. for one minute. By adding such a coloring agent, the coating which does not discolor when let to stand at 200° C. for one minute can be obtained. The coloring agent may be carbon, inorganic pigments such as oxides of Ti, Co, Ni, Zn, etc. or organic pigments such as phthalocyanine pigments and quinacridone pigments.

The paint film on the wire not drawn should have a thickness of 1 to 500 microns. If less than 1 micron, the paint film after drawing would be less than 0.1 micron, which is insufficient for color identification. If over 500 microns, the paint film could peel off the wire during drawing due to poor adhesiveness.

In the present invention, the stainless steel wire to be painted may be nickel-plated beforehand with a thickness of 0.1 to 15 microns. In other words, nickel-plated stainless steel wire may be painted.

In the present invention, the stainless steel wire painted by baking is drawn to obtain a uniform wire diameter. This allows the lubricant used for drawing to remain in a thin layer for the next step that is the working into springs. If the wire were painted by baking after drawing, it would have decreased toughness.

In the present invention, the paint film after baking should have a pencil hardness of 6H or less. If the hardness were over 6H, the die for drawing would wear soon.

EXAMPLE 1

The composition of stainless steel wires (SUS 304) used was as follows:

| C | Si | Mn | Cr | Ni | Fe |
|---|---|---|---|---|---|
| 0.07 | 0.53 | 1.43 | 18.34 | 8.58 | Balance (in wt %) |

Wires having a diameter of 2.4 mm and subjected to solution heat treatment were coated with fluororesin paints either colored red with an organic coloring agent or colored green with an inorganic pigment. The paint coatings were dried for 20 minutes in the air at 250° C., and then baked for 20 minutes in the air at 380° C. The red paint baked was found to be hard enough to be marred with a pencil lead having a hardness of 3H, while the green paint was found to be hard enough to be marred with a pencil lead having a hardness 5H. They were not marred with a less hard pencil lead. Then the coated wires were cold-drawn to a diameter of 0.8 mm to make five specimens which had different thicknesses of the coating as shown in Table 1. Difference in the thickness of the coating was produced by repeating paintings in different times. The above-mentioned five specimens were subjected to coiling tests in which they were coiled to find the minimum ratio of wire diameter to coil diameter that caused peeling of the coating.

Color distinguishableness was also examined. Table 1 shows the test results.

TABLE 1

| | | | | | |
|---|---|---|---|---|---|
| Thickness (μm) of coating before drawing | 0.5 | 2 | 10 | 300 | 1,500 |
| Thickness (μm) of coating after drawing | 0.05 | 0.2 | 1.0 | 30 | 100 |
| Color distinguishableness | Indistinct | Distinct | Distinct | Distinct | Distinct |
| Coating adhesion* | 6 | 5 | 5 | 5 | 9 |

*In terms of minimum ratio of wire diameter to coil diameter causing mar

Table 1 indicates that a coating thinner than 0.1 μm has poor color distinguishableness and that a coating thicker than 50 μm is attended with a marked decline in the coating adhesion.

EXAMPLE 2

Stainless steel wires having a diameter of 0.8 mm and a paint coating 1.0 μm thick were produced in the same way as in EXAMPLE 1, except that they were nickel-plated to a thickness of 3 μm before they were coated with paints. They were produced by forming a paint coating 10 μm thick on wires having a diameter of 2.4 mm, baking the paint coating and drawing the wire. The specimens were tested for color distinguishableness and adhesiveness of the coating. The tests showed that the specimens had a clear color distinguishableness and that no peeling was observed if the wire were coiled to a diameter equal to five times the wire diameter. The results indicate that stainless steel wire having substantially the same performance can be produced if the stainless steel wire to be painted is nickel-plated.

EXAMPLE 3

A stainless steel wire having a diameter of 2.4 mm was coated with a resinous paint to a thickness of 10 μm, baked, and drawn to a diameter of 0.8 mm. The hardness of paint coating was adjusted to different values by changing the baking temperature. The specimens were tested for drawability in relation to the hardness of coating directly after baking by observing the wear of the die after used to draw the wire weighing 100 kg. The diameter of hole of the die was checked both before and after drawing. Table 2 shows the test results. The results show that the paint coating having a pencil hardness of 7H caused severe wear.

TABLE 2

| Baking temp (°C.) | Minimum pencil hardness | Dia. of die hole before drawing (1) (in mm) | Dia. of die hole after drawing (2) (in mm) | Wear of die (2)-(1) |
|---|---|---|---|---|
| 330 | H | 0.798 | 0.798 | 0 |
| 350 | 3 H | 0.798 | 0.798 | 0 |
| 400 | 5 H | 0.797 | 0.798 | 0.001 |
| 430 | 7 H | 0.799 | 0.850 | 0.051 |

EXAMPLE 4

A paint coating with a thickness of 10 μm was formed by baking on wires having a diameter of 3.0 mm in the same manner as in EXAMPLE 1. By drawing the wires, stainless steel wires having a diameter of 1.0 mm and a paint coating 1.0 μm thick were made. They were worked into springs. Similarly, nickel-plated stainless steel wires were coated with paint resin, drawn and worked into springs. The springs made from the stainless steel wire were compared with the springs made from the nickel-plated stainless steel wire in the free length. Table 3 shows the results of comparison. It shows that there is no appreciable difference in the variation in the free length between them and thus no difference in workability into springs. Also, the colored stainless steel wire worked into springs showed no discoloration when heat treated for 30 minutes at 400° C.

TABLE 3

Comparison between Stainless Steel Wire and Nickel-plated Stainless Steel Wire in Free Length

| Free length (in mm) | Stainless steel wire Number of times | Nickel-plated stainless steel wire Number of times |
|---|---|---|
| 39.675–39.725 | 0 | 0 |
| 39.725–39.775 | 2 | 1 |
| 39.775–39.825 | 1 | 1 |
| 39.825–39.875 | 2 | 2 |
| 39.875–39.925 | 14 | 10 |
| 39.925–39.975 | 15 | 20 |
| 39.975–40.025 | 27 | 29 |
| 40.025–40.075 | 18 | 18 |
| 40.075–40.125 | 16 | 14 |
| 40.125–40.175 | 3 | 3 |
| 40.175–40.225 | 2 | 2 |
| 40.225–40.275 | 0 | 0 |
| | $\bar{X} = 40.00$ | $\bar{X} = 40.00$ |
| | $\sqrt{V} = 0.086$ | $\sqrt{V} = 0.079$ |

Spring specifications

| | |
|---|---|
| Wire diameter | 1.0 mm |
| Coil diameter | 10.0 mm |
| Total number of turns | 8.5 |
| Number of effective turns | 6.5 |
| Free length | 40 mm |

What is claimed is:

1. A cold drawn stainless steel wire having a coating of colored resinous paint with a thickness of 0.1 to 50 microns, wherein said coating is applied and baked to a pencil hardness of 6 or less before the wire is cold drawn, and said coating being heat-resistant so as not to discolor if heated for annealing for 1 to 60 minutes at a temperature of 200° to 400° C.

2. A cold drawn stainless steel wire as set forth in claim 1 wherein the wire includes a nickel plated layer with a thickness of 0.1 to 15 microns on the wire before coating with the colored resinous paint.

* * * * *